United States Patent
Uno et al.

[15] 3,688,670
[45] Sept. 5, 1972

[54] LOCK DEVICE FOR SHUTTER BUTTON IN PHOTOGRAPHIC CAMERA

[72] Inventors: Naoyuki Uno, Oi-machi, Iruma-gun; Fumio Urano, Tokyo, both of Japan

[73] Assignee: Asahi Kogaku Kogyo Kabushiki Kaisha, Tokyo-to, Japan

[22] Filed: July 9, 1971

[21] Appl. No.: 161,094

[30] Foreign Application Priority Data
July 16, 1970 Japan....................45/70545

[52] U.S. Cl................95/31 AC, 95/31 R, 95/31 FL, 95/53 R
[51] Int. Cl.........................G03b 17/42, G03b 19/04
[58] Field of Search.....95/53 R, 31 R, 31 AC, 31 FL

[56] References Cited

UNITED STATES PATENTS 2,930,303   3/1960   Sago et al...............95/31 AC

*Primary Examiner*—Samuel S. Matthews
*Assistant Examiner*—Robert P. Greiner
*Attorney*—Christie, Parker & Hale

[57] ABSTRACT

A combined shutter button having a lock and a film transport assembly for a photographic camera. An axially movable shutter button and a rotatable member is mounted in coaxial relation to the button. A locking mechanism comprises first and second engaging members mounted, respectively, on the shutter button and rotatable member and have a first cooperating relationship wherein the first and second members engage and lock the shutter button against actual movement and a second cooperating relationship wherein the first and second members are out of engagement upon actuation of the shutter button. A film transport mechanism comprises a film transport lever rotatable for actuation of the mechanism to thereby transport film in the camera. Means is provided for coupling the transport lever to the rotatable member for movement of the rotatable member in order to establish one or the other of the cooperating relationships upon rotation of the film transport lever.

5 Claims, 5 Drawing Figures

INVENTORS.
NAOYUKI UNO
FUMIO URANO

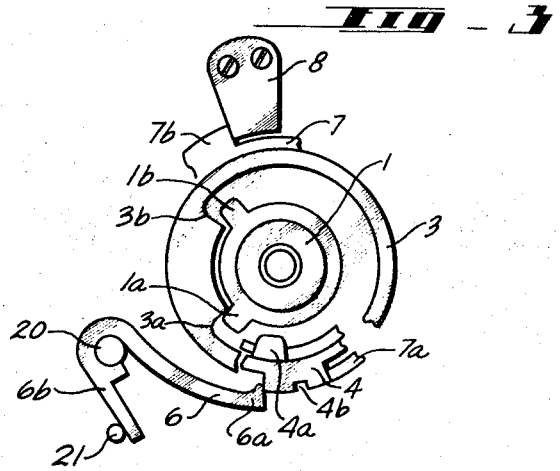
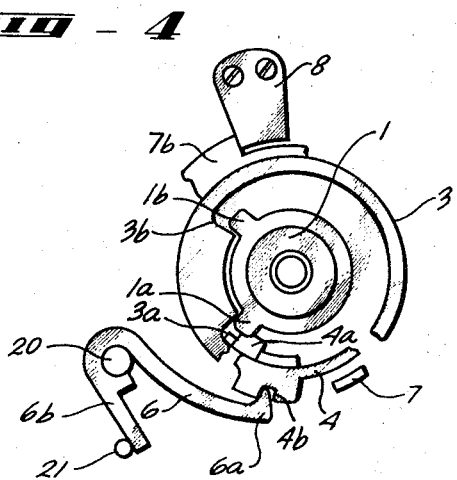
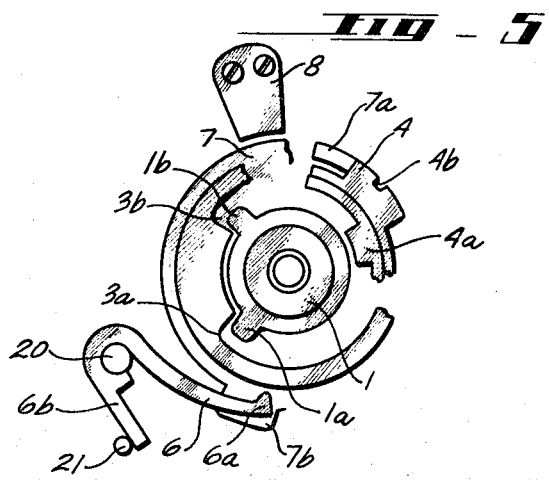

LOCK DEVICE FOR SHUTTER BUTTON IN PHOTOGRAPHIC CAMERA

BACKGROUND OF THE INVENTION

1. Field of the Invention

The present invention relates to a lock device for a shutter button in a photographic camera by which said shutter button is effectively locked in association with operation of a film transport lever and particularly to such a device by which said shutter button is effectively locked in coincidence with the position on which said film transport lever is stored after completion of the film transport.

2. Description of the Prior Art

The film transport lever of a camera is usually moved through a preparatory angle and then through a film transport angle during actuation. In view of the fact that movement of the film transport lever over the preparatory angle corresponding to the angle from the position on which said lever is stored to the position on which the film transport operation is ready is independent of members such as those related to film transport manipulation, the shutter and the mirror, the present invention utilizes the movement of the film transport lever over this preparatory angle in order to lock the shutter button.

SUMMARY OF THE INVENTION

The present invention thus provides a lock device for a shutter button in a photographic camera with which the shutter button is effectively locked by manipulation of a film transport lever configurated or disposed so as to be manipulated by a finger easily in a sense of human engineering and any accidental shutter release is prevented merely by setting the film transport lever to its storage position after completion of each film transport. According to the present invention, a rotatable member having an engaging portion adapted to get rid of its effective engagement range in a range defined by a part of rotation range of said rotatable member is disposed in the range into which the shutter button is to be depressed in coaxial relationship with said shutter button so as to be operatively associated in unison with the film transport lever while said shutter button is disposed in non-rotatable manner and provided with a checkup portion to be checked up with said engaging portion of the rotatable member so that said range in which said engaging portion gets rid of its effective engagement range under effects of these engaging portions and checkup portion corresponds to the position onto or out of which the film transport lever is stored or withdrawn, respectively, and the shutter button is allowed in this range to be depressed.

BRIEF DESCRIPTION OF THE DRAWING

A preferred embodiment of the invention is shown by the accompanying drawing in which:

FIGS. 3 to 5 are schematic plan views illustrating the manner in which said shutter button operates.

DETAILED DESCRIPTION OF THE INVENTION

Figure 1:
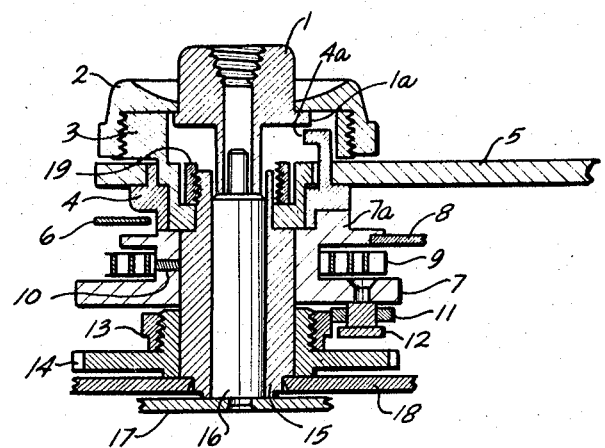
FIG. 1 is an axial sectional view of the part of a photographic camera on which a shutter button is mounted and embodying the present invention.
Figure 2:
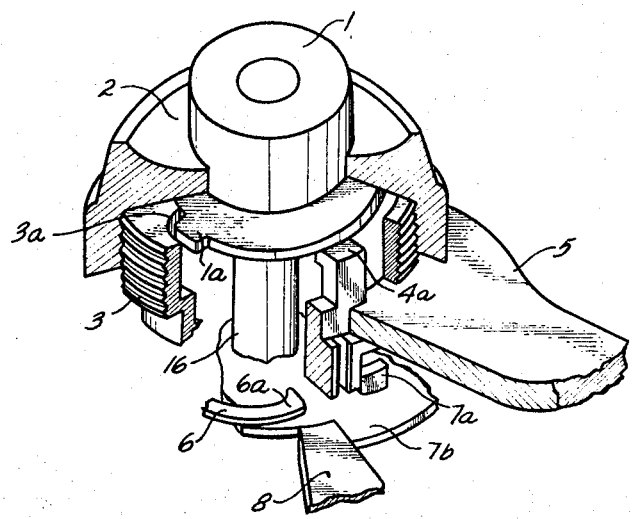
FIG. 2 is a schematic and perspective view, partially given in section, of an important portion of the part on which the shutter button is mounted.

Now in the embodiment as shown by the accompanying drawing, a shutter button 1 having a narrow stalk portion is connected around upper portion of a shutter button core 16. Core 16 is connected at its lower part with a release plate 17. Projections 1a and 1b radially extend from the periphery of the shutter button 1 and the projection 1a define a checkup portion. A finger seat 2 is screwed on finger seat support 3 which is, in turn, secured through a nut 19 on a shaft 15 fixed to a base plate 18. Stops 3a and 3b are formed on the finger seat support 3 and prevent the shutter button 1 from being further rotated. A lever support 4 serves as the rotatable member to which a film transport lever 5 is fixed. The lever support 4 has an engaging piece 4a defining the engaging portion which is adapted to lock the shutter button 1. The lever support 4 also has a groove 4b adapted to position the film transport lever 5 in the locking operation.

One end of a leaf spring 6, having an axis 20 on which the leaf spring 6 is supported, comes into engagement into the positioning groove 4b in the locking situation. Another end 6b of the leaf spring 6, a stop 21 for the leaf spring 6, and a ratchet support 7 on which a ratchet 11 and a restoring spring 9 are secured by a screw 10 and a dowel 12. The ratchet is a conventional ratchet that engages ratchet wheel 13 and forces it to rotate as film strip lever 5 is rotated counterclockwise but, through ratchet action, does not move ratchet wheel 13 as the lever 5 moves clockwise. The ratchet support 7 is provided with a projection 7a through which the ratchet support 7 is held in cooperation with the lever support 4 and a stop 7b formed outside the projection 7a. A control plate 8 is rigidly affixed to a housing (not shown) which restrains the ratchet support 7 against rotation. A ratchet wheel 13 is fixed to a film transport gear 14.

It should be noted here that the lever support 4, the ratchet support 7 and the film transport gear 14 are supported by securing the finger seat support 3 on the shaft 15 with the nut 19.

Consider now the operation of the invention. When the film transport lever 5 is counterclockwise rotated, an engaging portion provided on the lower part of the lever support 4 strikes against the projection 7a of the ratchet support 7 and thereby the film transport gear 14 is rotated through the ratchet 11 and the ratchet wheel 13. Such rotation of the gear 14 is accompanied by movement of the members related to film transport and, as a result, a predetermined length of film is effectively transported. On this moment, as seen in FIG. 5, the projection 1a of the shutter button 1 is out of engagement with the engaging piece 4a of the lever support 4.

When the film transport lever 5 is clockwise restored under the effect of the restoring spring 9 upon completion of film transport, the ratchet support 7 is rotated back to the position on which the stop 7b of the ratchet support 7 comes into engagement with the control plate 8 as seen in FIG. 3.

At this moment, however, the projection 1a of the shutter button 1 is still out of engagement with the engaging piece 4a of the lever support 4 as in the previous case, so that the shutter button 1 is allowed to be depressed and film transport may be repeated after shutter release.

This situation corresponds to the position onto or out of which the film transport lever is stored or withdrawn and, in order words, to the position preparatory for film transport or the position from which the lever 5 starts film transport. If the film transport lever 5 is further clockwise rotated from the position onto or out of which the film transport lever 5 is stored or withdrawn so as to set the lever 5 in the storage position, the ratchet support 7 and the film transport gear 14 are no longer rotatable under the effects of the stop 7b and the control plate 8 as seen in FIG. 4, leaving only the lever support 4 to be rotated by the film transport lever 5. Thus, the leaf spring 6 is engaged at one end 6a into the positioning groove 4b of the lever support 4 and thereby the film transport lever 5 is positioned on the position of storage. It is on this moment that the projection 1a of the shutter button 1 is underneath and in engagement with the engaging piece 4a of the lever support 4. The projection 1a of the shutter button 1 is now in engagement with upper surface of the engaging piece 4a of the lever support 4 and thereby the shutter button 1 is locked against being depressed.

To lock the shutter button 1, on the contrary, into a depressed position, as required in cases such as time, photographing, the shutter button 1 is to be depressed when the film transport lever 5 is in the position onto or out of which the film transport lever 5 is stored or withdrawn, so that the desired locking effect may be achieved by setting the film transport lever 5 on its storage position when the shutter button 1 is depressed. The projection 1a of said shutter button 1 is under and in engagement with lower surface of the engaging piece 4a of the lever support 4, blocking the shutter button 1 against its restoration.

Although, in the embodiment as shown, the lever support 4 serving as the rotatable member is provided with the engaging piece 4a as its engaging portion and the shutter button 1 is provided with the projection 1a formed on the periphery thereof serving as the checkup portion to be positioned in the engagement range of said engaging piece 4a, there may be an alternative embodiment wherein said projection 1a is replaced by a notch formed in periphery of the shutter button 1 as said checkup portion so that the engaging piece 4a is engaged with the notch in occluding relationship when the film transport lever 5 occupies the position onto or out of which said film transport lever 5 is stored or withdrawn. In such an alternative embodiment, the shutter button 1 is allowed to be depressed only when the film transport lever 5 occupies the position onto or out of which said film transport lever 5 is stored or withdrawn.

There may be still another embodiment wherein the engaging piece 4a and the notch are configurated in the inverse relationship. More specifically, the shutter button 1 is provided on the periphery thereof with a member corresponding to said engaging piece 4a and the lever support 4 is provided with a member corresponding to the notch so that these two members occlude with each other only when the film transport lever 5 occupies the position onto or out of which said film transport lever 5 is stored or withdrawn whereby the shutter button 1 is allowed to be depressed.

As understood from the foregoing description, the lock device according to the present invention is very convenient in practical use in that the desired locking effect may be quickly and easily obtained. The requirement that the locking effect should be released as quickly as possible and easily obtained again through a simple manipulation is effectively met in actual photographing by the present invention will utilizes the preparatory angle of the film transport lever positioned so that a finger tip is always in contact with the film transport lever.

Furthermore, the shutter button may be locked merely by setting the film transport lever to the position onto or out of which said film transport lever is stored or withdrawn, so that the shutter button can be unlocked at once and subjected to shutter release even when the user directs the camera to an object to be photographed without considering that the shutter button is in locked position. This is extremely advantageous particularly in photographing the objects such as those in swift movement for which it is never permissible to miss a shutter chance. Also, in case that a photographing is suspended for some reasons although the camera has been set to the condition preparatory for photographing, the locking manipulation of the shutter button is rarely failed because said locking manipulation is possible with the film transport lever with which the finger tip is always in contact.

The cover is put on the camera and at the same time the film transport lever is inevitably stored on the predetermined storage position, so that no accidental shutter release may occur during non-use even if the camera is of the type which has a soft cover.

Finally, the present invention provides an economical advantage in that the number of parts and assembly processes may be reduced since the locking mechanism is provided in unison with the film transport lever.

We claim:

1. A combined shutter button having a lock and film transport assembly for a photographic camera, the assembly comprising:
   an axially movable shutter button;
   a rotatable member mounted in coaxial relation to said button;
   a locking mechanism comprising first and second engaging members mounted, respectively, on said shutter button and rotatable member and having a first cooperating relationship wherein said first and second members engage and lock said shutter button against axial movement and a second cooperating relationship wherein said first and second members are out of engagement upon actuation of said shutter button;
   a film transport mechanism comprising a film transport lever rotatable for actuation of said mechanism to thereby transport film in the camera; and
   means for coupling said transport lever to said rotatable member for movement of said rotatable member in order to establish one or the other of said cooperating relationships upon rotation of said film transport lever.

2. The assembly of claim 1 wherein said film transport mechanism comprises means for transporting the film responsive to a predetermined actuation direction and range in movement of said film transport lever, said film transporting means being adapted for not moving film during movement of said lever in a different non-film transporting range of movement, said coupling means enabling the film transporting range of movement for said film transport lever to establish said second cooperating relationship for said engaging members and enabling the non-film transporting range of movement for said film transport lever to establish said first cooperative relationship of said engaging members.

3. The assembly of claim 1 wherein said film transport lever has a storage position, a position in which it is ready for film transport and a range of positions for transport of film, said coupling means enabling said first cooperating relationship to be established when said film transport lever is in the storage position and enabling said second cooperating relationship to be established when said film transport lever is in either said position ready for film transport or in said range of positions for transport of film.

4. The assembly of claim 1 comprising a ratchet for coupling movement in only one direction of said film transport lever to said film transport mechanism for movement of film.

5. The assembly of claim 1 comprising a spring return coupled to said film transport lever.

* * * * *